Patented Dec. 4, 1934

1,982,987

UNITED STATES PATENT OFFICE 1,982,987

SENSITIZING OF PHOTOGRAPHIC EMULSIONS

Paul Goldacker, Berlin-Neukolln, Germany, assignor to Agfa Ansco Corporation, Binghamton, N. Y., a corporation of New York No Drawing. Application July 1, 1932, Serial No. 620,535. In Germany July 4, 1931

7 Claims. (Cl. 95—7)

My invention relates to the sensitizing of photographic emulsions and more particularly to sensitizing silver halide emulsions.

It is known that the sensitiveness of silver halide gelatin emulsions sensitized by means of sensitizing dyestuffs may be increased by a so-called hypersensitization, for instance, by treating these emulsions with an ammoniacal silver solution or, according to the processes disclosed in German patent specifications Nos. 500,874 and 504,457, with certain silver salts in the presence of hydrogen peroxide or feebly alkaline or acid substances having a reducing action. Such treatment increases the tendency of the emulsion to fog and diminishes its stability, whereby its practical use is greatly limited.

According to this invention, the sensitiveness of the emulsion is considerably increased without enhancing its tendency to fog and diminishing its stability by addition of a silver salt of an acid, the anion of which contains an atom of a heavy metal. The said silver salt may be added either during the preparation of the light-sensitive emulsion or to the finished emulsion before the latter is applied to a support. This observation is very surprising, because it is known (cf. Eder, "Handbuch der Photographie", vol. 3, 5th edition, page 135) that by the addition of salts of such heavy metals, for instance, uranyl nitrate, the sensitiveness of the emulsion is not increased. Moreover, it has been found that not only can the addition of hydrogen peroxide or of weakly alkaline or acid reducing agents, which was hitherto considered necessary, be dispensed with, but that this very addition gives rise to the fogging and reduction of stability of the silver halide emulsions thus treated.

The emulsions prepared or treated according to the following examples have, as compared with the untreated emulsion, a sensitiveness to light which is 2 to 3 times greater while the degree of tendency to fog, and of stability remain the same.

The following examples illustrate my invention:

Example 1.—1 kilo of a panchromatic emulsion is melted at 40° C. and mixed with 10 cc. of a solution of 1 gram of silver tungstate in 100 cc. of water and 2 cc. of an aqueous solution of ammonia of 25 per cent strength. Then it is applied to a support.

Example 2.—1 kilo of an ortho-chromatic emulsion is melted at 40° C. and mixed with 10 cc. of a solution of 1 gram of silver molybdate in 100 cc. of water and 2 cc. of an aqueous solution of ammonia of 25 per cent strength. Then it is applied to a support.

Example 3.—1 kilo of finely cut strips of a panchromatic emulsion is immersed at room temperature for 30 minutes in a solution of 0.2 gram of silver tungstate in 1000 cc. of water to which 3 cc. of an aqueous ammonia solution are added. The emulsion strips are then well squeezed and cast on a support.

What I claim is:

1. A process of preparing a highly sensitive silver halide emulsion which comprises adding to the emulsion at any stage of its preparation a solution of a silver salt of an acid the anion of which contains a metal atom of the tungsten group of the sixth series of the periodic system.

2. A process of preparing a highly sensitive silver halide emulsion which comprises treating the finished emulsion with a solution of a silver salt of an acid, the anion of which contains a metal atom of the tungsten group of the sixth series of the periodic system.

3. A process of preparing a highly sensitive silver halide emulsion which comprises treating the finished emulsion with a solution of silver tungstate.

4. A process of preparing a highly sensitive silver halide emulsion which comprises treating the finished emulsion with a solution of silver molybdate.

5. A silver halide emulsion sensitized by a silver salt of an acid, the anion of which contains a metal atom of the tungsten group of the sixth series of the periodic system.

6. A silver halide emulsion sensitized by silver tungstate.

7. A silver halide emulsion sensitized by silver molybdate.

PAUL GOLDACKER.